9085X
J. Payne,
Hay Press.
Patented Sep. 9, 1835.
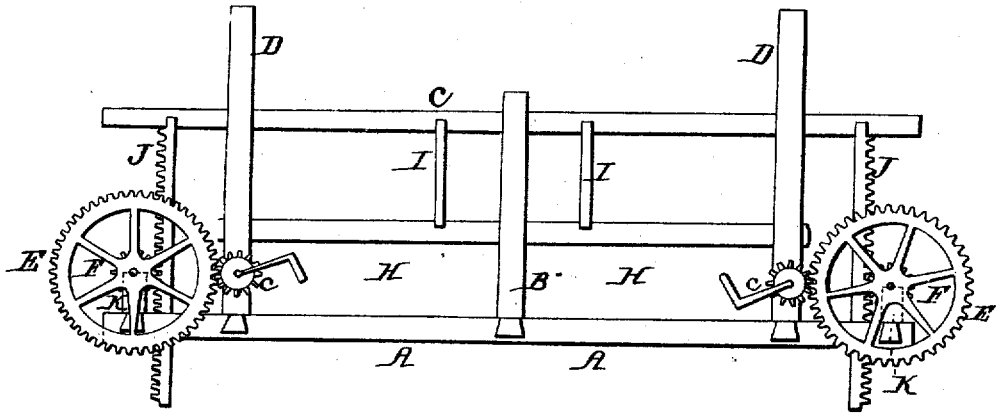
AM. PHOTO-LITHO. CO. N.Y. (OSBORNE'S PROCESS)

9085X Sept 9 1835 1

Jonathan Payne Russellvill Kentucky

Letters Patent.

The schedule referred to in these letters patent and making part
of the same containing a description in the words of the said
Jonathan Payne himself of his improvement in the Lever Press To all to whom these presents shall come.
Be it known that I Jonathan Payne of Russellville in the
county of Logan, and State of Kentucky, have invented a new
and useful Lever Press and that the following is a full and exact
description thereof together with a compleat drawing hereto subjoin
ed and referred to marked ☞ the different parts and
structure of of which is specifically set forth as follows, to wit
The bottom sill marked A.A to be made of solid timber
squared 24 by 20 inches measuring in length from 30 to 50 feet
as the greater or less power desired may require B represents
2 upright centre pieces hewn of solid timber 10 feet long 18 inches wide
and six inches thick dovetailed one of each side of sill A.A,
precisely in the centre of said sill and bolted with a strong iron
pin through through said upright pieces being placed in said sill
so as to preserve the space of 12 inches between them from top to
bottom Between and near the top of said upright pieces marked
B, as afsd. is suspended the main lever marked C on the
drawing by an iron pin 3 inches in diameter and twenty four
inches long, passed through sd pieces B, and lever C, lever C
from 30 to 50 feet in length and squared 18 by 12 inches
Letters D represents 2 upright pieces placed at the distance
of 4 feet from each end of sill A.A, of same width and
thickness of pieces B from 12 to 16 feet long, and dovetailed into
sill A.A, at each end as afsd as said upright pieces B, designed to keep within its proper sphere of action lever C, the
cog wheels E, in the drawing represents the large wheel measuring [illegible]
feet in diameter in the proportion to the scale of proportion given
in the foregoing parts. and the cast iron wheel and nuts F, from 7 to
8 inches in diameter are hung upon an iron axle of two inches square
fixed on two upright pieces of the same width as upright pieces B. & D,
and 4 inches thick dovetailed into sill A. A, one foot from each end
of sd sill rising above said sill 16 inches and marked in the drawing
K, said axle to be "placed" on said upright pieces K, so that the
wheel or nut F. shall run between said pieces K, and the large wheel
E, on the outside of them the small cast iron wheels or nuts with
a crank marked on the drawing C. are placed on iron axles inser
ted through upright pieces D, which wheel or nut is to be inserted or
placed as to fit with its cogs exactly into those of the wheel E.
middle levers K, are to be used for pressing flower manufactured
Tobacco, and all descriptions of oil. These lever beams are fasten
by a pin into and between upright pieces D, at a convenient
hight from sill A. A, and operated on by lever C, by means
of an iron suspender made of two iron bars keyed one on each
side of lever C and marked I on the drawing, the suspenders
I. are cast iron racks with cogs fit into the cogs of wheels or nuts
F fastened by iron pins in the ends of lever C, and passing
when drawn down at their lower end, through sill A. A. lever
C, is altogether sufficient for prizing Hogsheads of Tobacco or
bailing cotton and these uses will dispense with the use of
the upper levers K, This Machine is designed to be used in
prizing tobacco bailing cotton and pressing oil made of all
kinds of beans or seeds, as well as packing flower pressing
cider and making manufactured chewing Tobacco Jonathan Payne (L)

Witness
Thomas M. Smith
R. W. January

No 13. The above [illegible]
[illegible]

9085 X that it may be geared and operated upon one end of the lever or bolt as may be described Jonathan Payne (Model) (Drawing)